United States Patent [19]  [11] 4,043,513
Hoberg et al.  [45] Aug. 23, 1977

[54] PROCESS AND APPARATUS FOR SORTING REFUSE

[76] Inventors: Heinz Hoberg, Am Rosenhugel 21, Aachen-Laurensberg; Erwin Schulz, Turmstr. 29, Raeren, Belgien, both of Germany

[21] Appl. No.: 659,854

[22] Filed: Feb. 20, 1976

[30] Foreign Application Priority Data

Mar. 6, 1975 Germany .............................. 2509764

[51] Int. Cl.² ............................................ B02C 23/14
[52] U.S. Cl. ........................................ 241/24; 241/77; 209/137; 209/161; 241/DIG. 38
[58] Field of Search .............................. 241/DIG. 38; 209/136-139 R, 158-161

[56] References Cited

U.S. PATENT DOCUMENTS

| | | | |
|---|---|---|---|
| 1,890,206 | 12/1932 | Andrews | 209/160 |
| 1,937,190 | 11/1933 | Chance | 209/161 |
| 2,162,392 | 6/1939 | Solomon, Jr. et al. | 209/137 |
| 3,351,195 | 11/1967 | Hukki | 209/158 |
| 3,802,631 | 4/1974 | Boyd | 241/DIG. 38 |
| 3,848,813 | 11/1974 | Stancjyk | 241/DIG. 38 |
| 3,876,157 | 4/1975 | McIntire et al. | 241/DIG. 38 |
| 3,897,215 | 7/1975 | Davidson, Jr. et al. | 241/DIG. 38 |
| 3,922,975 | 12/1975 | Reese | 241/DIG. 38 |
| 3,925,198 | 12/1975 | Eckhoff et al. | 241/DIG. 38 |

Primary Examiner—Granville Y. Custer, Jr.
Attorney, Agent, or Firm—Spencer & Kaye

[57] ABSTRACT

Refuse, particularly of the household type, is sorted according to density by the following consecutive operations: Sifting the refuse; comminuting the oversize obtained; separating the comminuted material by a gas stream into light and heavy material fractions; separating the heavy material fraction by a liquid stream into two fractions of different density; and separating the two fractions of different density into basic components.

23 Claims, 4 Drawing Figures

PROCESS AND APPARATUS FOR SORTING REFUSE

The invention is concerned with a process for the sorting of refuse, especially domestic refuse, in which the refuse is reduced in size and sorted into groups of different material densities.

In the Germman Laid-Open Application (Offenlegungsschrift) No. 2,123,537 a process is described in which the comminuted refuse is charged to a horizontal hot gas stream which dries the paper component and carries it away, while the remaining refuse is separated into organic and inorganic fractions in a flotation separation process. The organic fraction is formed into a slurry by further comminution in order to separate out the remaining paper in the organic fraction. The organic residues are then degassed by heat decomposition. The inorganic solids are sorted into metallic and non-metallic fractions. The disadvantage of this process is that only the paper, and then only partially, is extracted from the comminuted refuse by means of a gas stream, since substantial drying is necessary for entrainment of the paper in the hot gases. The remaining refuse is conveyed to a wet separator, the organic components being converted into a slurry, which necessitates a second intensive size-reduction stage after the extraction of the paper in the hot gas flow, firstly, to make it possible to produce a slurry at all and secondly to make the slurry, which still contains the inorganic metal solids, pumpable. A serious disadvantage of this stage of the process is that expensive water-using processes are involved, since separation of the slurried solids from the water requires expensive equipment, and effective clarification of the water is also required, even if it is largely circulated within the plant.

A basic object of the invention is to provide a process for sorting refuse, particularly domestic refuse, which works much more effectively and permits better sorting into the various types of material present in the refuse.

The process according to the inventon accomplishes this object as follows: first the fines are separated from the refuse by screening. After comminution, a gas stream separates the refuse into a light material fraction and at least one heavy material fraction, and the heavy fraction is divided into two categories of different densities by a liquid flow, these two categories being later sorted into different basic materials. The advantage of this process is that the subsequent sorting stages are made easier by the screening off of the fines before comminution of the refuse, and the various groups of materials are more cleanly sorted. Further advantages of the screening of the fines, consisting mainly of ash, sand and fine organic components, are a reduction of the abrasion in the comminution stage, and material water economy in the wet sorting process. Since, following comminution, the refuse is charged to a gas stream which should preferably flow upwards, it remains for a comparatively long period in the gas stream, thus achieving a high rate of extraction of light material. For example, from refuse from a fairly large town treated in this way, approximately 80% of the paper and over 95% of the light plastic material in the crude refuse can be extracted. Since the extracted product, especially the paper, disintegrates in water, the substantial separation of the paper before wet sorting results in considerable water economy, so that at the wet sorting stage, in which the heavy material is separated for the most part into an organic solids fraction and an inorganic solids fraction, the separaton is more clear-cut.

In a development of the process according to the invention, comminution is effected mainly by a cutting process. The advantage is that metal and plastic containers in the refuse, which are often filled with other rubbish, are much better opened up by this process. In particular, undesirable over-comminution of glass in the refuse is avoided and stoppages at the comminution stage caused by very strong fabrics, such as nylon stockings, are practically eliminated. Compared with impact crushing, these are important advantages, because the metal containers in domestic refuse, for example, owing to their characteristic ductility, are often not broken up by the action of the impact crusher, but simply crushed flat with the solids contents inside, while the glass and ceramic components are ground excessively, so that the advantage obtained by the previous screening is to a large extent cancelled out.

A preferred embodiment of the invention provides that the gas stream flows upwards with several changes of direction and that the refuse to be separated into light and heavy materials is introduced into the gas stream at a point where the flow direction is deflected. The light material is carried upwards by the gas, which is deflected at least once more, whereas the heavy material sinks against the direction of flow and is separated from the gas stream. At the vertex of a deflection between the refuse charging point and the extraction point for the heavy material, a partial gas stream branches off to a trap which intercepts the entrained medium-density material. This process method has the advantage that, owing to the deflection of the gas flow on the one hand and the gravity forces acting on the refuse moving against the gas flow on the other, the gas flows straight through the refuse stream at that point, so that even without previous layering of the refuse, the light material can be entrained by the gas flow. Due to the fact that the refuse flow is deflected in the same way as the gas flow, a re-arrangement of the material takes place at each deflection point, which improves still further the separation of the light from the heavy material. By means of the partial gas flow diverted from the main stream, material of medium density is collected, and since this consists largely of organic matter, it can be utilised directly, e.g. by composting or burning. In addition, the extraction of this material of medium density, composed largely of organic matter materially facilitates the wet sorting operation which follows. A convenient plant arrangement provides for the flow rate adjustment of at least of the branch gas stream. In this way the dry sorting process can be easily adapted to suit the composition of the refuse, which is of particular advantage for adjusting the operation to compensate for seasonal fluctuations in the composition of the refuse.

A development of the process according to the invention provides further for the heavy material separated from the gas flow to be charged to the surface of a liquid flowing upwards, the flow rate to be preferably adjustable. The floating refuse components are carried off by the liquid, while the remaining components sink against the flow of the liquid and are discharged. The advantage of this method is that the partial drying of the organic components in the preceding separation operation in the gas stream is utilised, since, when charged to the surface of the liquid, the organic components are only slightly moistened and retain their floating capability. By regulating the rate of flow, the required separation boundary can be set so that, in addition to refuse mainly of vegetable origin, plastics material can also be practically completely separated, with only metal, ceramics and glass components sinking. The light materials still adhering to the parts which sink, such as bottle labels, dirt etc., are detached by this means and also carried upwards by the liquid flow.

It is particularly useful if the flow rate at a certain distance under the surface of the liquid is higher than in the zone above. The sinking refuse components are then dammed up directly above the zone where the flow rate is greater. They are supported as in a fluidised bed, thus substantially increasing the time spent in the liquid and improving the cleaning effect still further.

A development of the process according to the invention provides further for the liquid to be drawn off by overflowing at one side, and for the heavy material from the dry separator to be charged on the side opposite to the outflow, preferably in the direction of the outflow. This has the advantage that, owing to the long time spent on the surface by the floating material, the separation effect can be improved, so that the remaining organic matter among the heavy material and also the heavy plastics can be floated off. For this reason, the further development of the process according to the invention provides that the components which are floated off are separated into two fractions of different densities in a second rising liquid flow separator. By this means the organic components can be separated from the heavy plastics.

The heavy material can with advantage be charged by a vibrating conveyor, the discharge edge of which is above and close to the surface of the liquid. A certain layering of the heavy material takes place in the vibrating conveyor, since the heavier parts accumulate on the bed of the conveyor and the lighter parts stay on top. If the discharge edge of the conveyor is just above the surface of the liquid, the relatively short drop of the heavy material on to the surface of the liquid reduces the depth to which the floating components sink into the liquid, so that in practice they cannot, in the time available, absorb so much liquid as to be fully soaked.

The invention further includes a plant for performing the process according to the invention, having at least one size-reduction unit, at least one first sorting device (dry separator) operating with gas as the separating medium, for extracting the light material, and at least one second sorting device (wet separator), operating with a liquid as the separating medium, for the heavy material from the first separating device. The invention provides that the size-reduction unit is connected on the intake side with at least one screen and on the discharge side through a charging device with an essentially vertical zig-zag gas duct as a dry separator, the discharge apparatus for the heavy material being connected to the wet separator. The gas duct is connected at its lower end to a gas supply duct and at its upper end to an extraction duct for gas and light material.

In a useful arrangement of the plant according to the invention, there is an opening for a partial gas stream at the vertex of a deflection in the zig-zag gas duct under the refuse charging point and above the heavy material discharge point. This opening is connected to a trap for the entrained medium-density material. This arrangement provides a component of the gas flow which goes right through the refuse stream, permitting separation of the screened and size-reduced crude refuse into three fractions. Expediently, the opening is arranged in line with the gas supply duct so that a very small partial gas flow with a relatively high flow speed can be drawn off, which improves the sorting effect. In a further development a device is provided for adjusting the size of the opening, thus permitting alteration of the separation effect without adjusting the total gas flow.

A development of the plant according to the invention also envisages that the wet separator consists essentially of a vertical channel, with a liquid inlet, preferably adjustable, in the lower part, and an open surface with liquid run-off, preferably at one side, at the top end. The heavy material is charged just above the surface of the liquid. Very good separation of the buoyant organic components of the heavy material from the dry separator can be achieved with this installation. The rate of flow and thus the separation boundary can be regulated to suit the composition of the refuse by adjusting the flow at the liquid intake. In a further refinement, the heavy material feed is designed as a vibrating conveyor and is so positioned in relation to the wet separator that its discharge edge is just above the surface of the liquid. This provides, on the one hand, pre-sorting of the heavy material, and on the other, prevents the floating components from becoming too wet.

The invention is explained below in detail with the aid of schematic drawings illustrating a suggested plant design.

Figure 1:
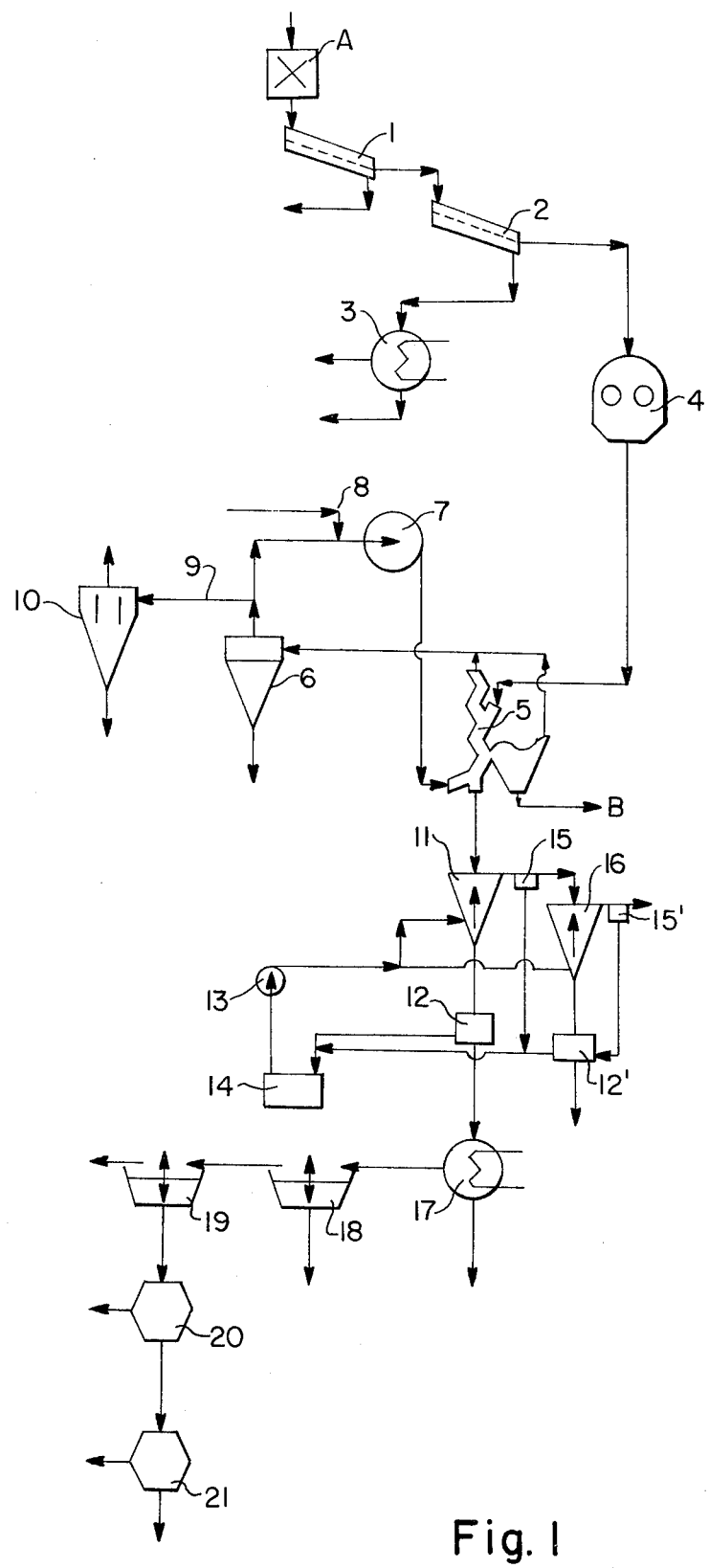
FIG. 1 is a flow chart of the process according to the invention.

In an embodiment of a plant constructed according to the invention, and here illustrated by a flow chart, two screens, 1 and 2, are provided. The fines under e.g. 20 mm are separated by screen 1 and those under e.g. 40 mm are separated by screen 2. It is advisable to extract the iron constituents from the undersize obtained from the screen 2 by means of a magnetic separator 3. The undersize from screens 1 and 2 can be either composted or burnt, depending on the composition of the crude refuse, which can fluctuate seasonally. In appropriate cases a ripping device A for opening refuse sacks etc. can be usefully installed upstream of the screens. The oversize from screen 2 is conveyed to a size-reduction machine 4, e.g. a cutting roller type comminuter, which reduces the screened refuse to a size of 100 mm, so that metal and plastic containers filled with refuse are also broken open, facilitating a subsequent separation of the refuse into the various groups of materials. After comminution, the refuse is conveyed to a vertical zig-zag gas duct, through which air flows and which constitutes a dry separator 5. The dry separator 5, which is described below in greater detail, is connected at its lower end to fan 7 and at the top end to a trap 6, in which the light material from the dry separator is separated from the air. Fan 7 circulates the air through the separator 5 and the trap 6. A fresh air inlet 8, preferably adjustable, at the intake side of the fan, and an exhaust air outlet 9 connected to a dust trap 10, for example a bag filter, at the gas outlet side of trap 6, prevent the air circulating through the dry separator from being charged with moisture and prevent the temperature from dropping below dewpoint. For normal operation the air need not be heated. In winter, or when hot gas is available from a nearby incinerator, the temperature of the air circulating in the dry separator can be raised by introducing hot exhaust gases at fresh air inlet 8.

In this embodiment, the dry separator is designed to separate the size-reduced refuse into three components. The light material intercepted by trap 6 consists mainly of paper, light plastics and fabric. The medium-density material B consists mainly of organic matter, especially some of the vegetable material contained in the refuse, whereas the heavy material consists mainly of glass, ceramics, bones, metal and the heavy, large pieces of organic material, especially vegetable waste, orange peel and the heavy plastics.

The heavy material from the dry separator 5 is conveyed to a wet separator 11, the operation of which will be described in detail below. In the wet separator, which operates with a rising liquid flow, for example water, the organic part of the heavy material floats and is carried off on the surface of the water, whereas the material consisting mainly of glass, ceramics and metal sinks, and the water is later drained off in a draining device 12. The water is circulated by a pump 13, and a clarifier 14 can be installed at the suction side of pump 13 if the amount of dirt in the water makes this necessary.

The organic material floated off by the water is also passed to a suitable draining device 15, for example a DSM screen, and then charged to a second similar type of wet separator 16, in which the material is sorted into organic matter, which floats off, and heavy plastics, which sink. The organic matter is drained off in a draining device 15', while the heavy plastics are drained off in a draining device 12'. Wet separator 16 has a water duct similar to that in wet separator 11. Depending on the size of the plant, it may be useful to connect both separators to a common clarifier for treating the water.

The material which has sunk and been discharged from wet separator 11 is first conveyed past a magnetic separator 17 to extract the iron, and then passed through conventional sorting machines 18, 19, 20 and 21, in which first the non-ferrous metals are extracted, then glass and ceramics are separated and finally (sorting machines 20 and 21) the clear glass is separated from the colored glass.

Figure 2:
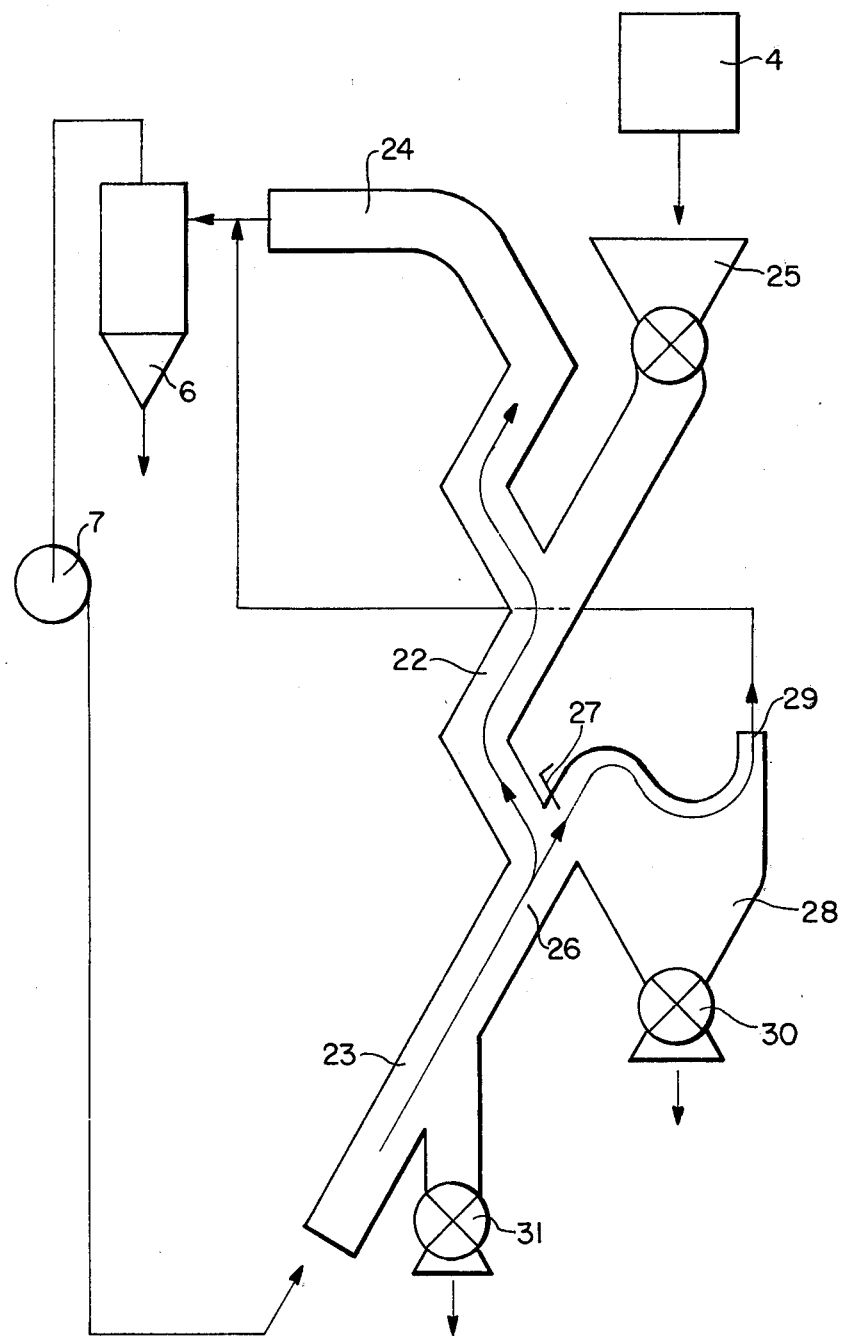
FIG. 2 is a schematic elevational view of the dry separator.

The mode of operation of the dry separator is explained in detail with the aid of FIG. 2. To assist comprehension, the relevant plant items are sketched in with the reference numbers used in FIG. 1. The dry separator consists essentially of a zig-zag duct 22 with a gas supply duct 23 at the lower end and a gas extraction duct 24 at the top end, which is connected to trap 6. The gas supply duct 23 is connected to the pressure side of fan 7. The crude refuse from the size-reduction machine 4 is charged to the gas duct at the vertex of a deflection point by a charging device 25, e.g. a compartmentalized rotary wheel dispenser. The light material, consisting mainly of paper, fabric and light plastics, is detached from the refuse flow, entrained by the gas and carried through gas extraction duct 24 to trap 6. The heavy material falls against the direction of the gas flow, and in so doing it is swirled about owing to the successive deflections of the gas flow, so that any light material still present is loosened and entrained in the gas.

An opening 26 is provided at a deflection point in line with the gas supply duct. The cross-section of the opening is adjustable by means of slide valve 27. Opening 26 leads to a trap 28, at the top of which there is a gas outlet 29, which is connected to trap 6; if required, a fan may be installed between the two traps. On the lower part of trap 28 there is a discharge device 30, e.g. a compartmentalized rotary wheel dispenser, by means of which the medium-density material collected in trap 28, and consisting largely of organic material, is discharged. This medium-density material can be transported to an incinerator, a composting plant or a refuse dump. The heavy material is discharged through a compartmentalized rotary wheel dispenser 31 and consists for the most part only of the inorganic refuse and heavy organic material, especially heavy plastics, bones and the like. This heavy material is conveyed to the wet separator, which is described in detail below.

Figure 3:
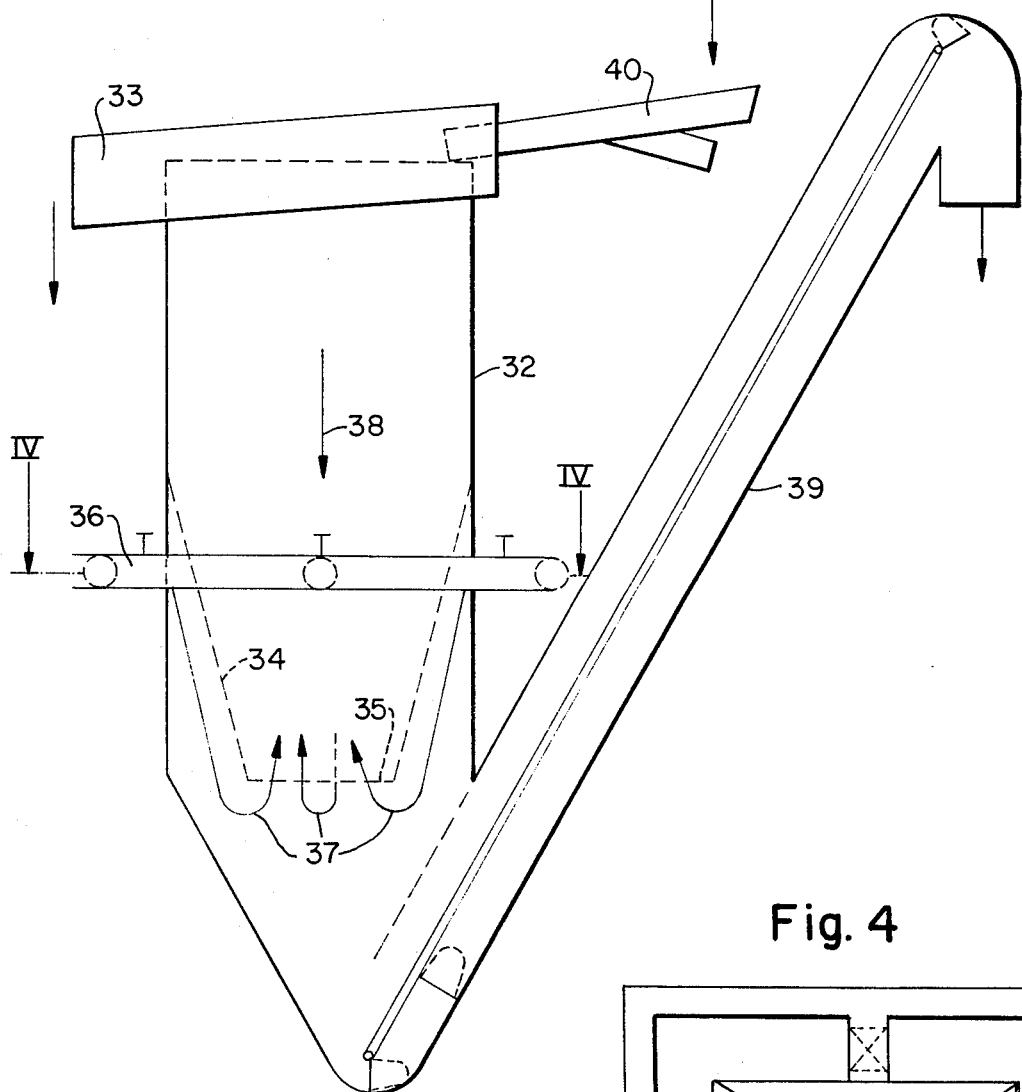
FIG. 3 is a schematic elevational view of the wet separator.
Figure 4:
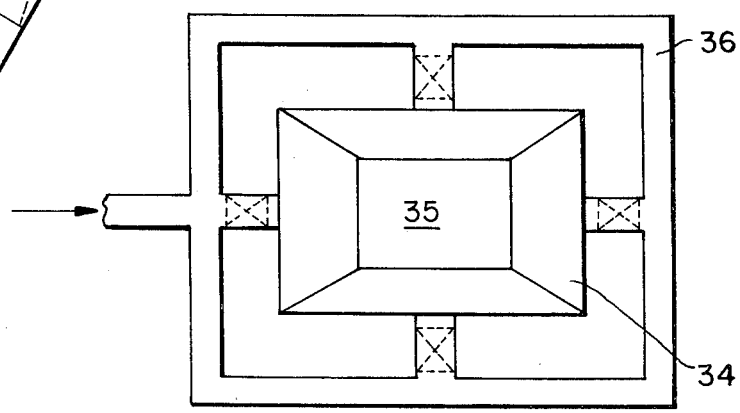
FIG. 4 is a sectional view taken along line IV—IV in FIG. 3.

The wet separator shown in FIGS. 3 and 4 is essentially a vertical flow channel 32 with an overflow 33 at the top which forms an open surface. An insert 34, which tapers towards the foot and in accordance with the invention narrows the flow cross section of the flow channel 32 towards the foot, causes the liquid, e.g. water, which flows upwards, to reach its highest flow speed at the orifice 35 of insert 34. The zone adjacent to and just below orifice 35 where the cross section again widens out and where practically no flow is present, permits the heavy material to sink towards the heavy material discharge. The liquid supply ports are located above orifice 35 of the tapered insert and the liquid flows into the flow channel between the walls of the flow channel and insert 34. Because of this it is possible with, for example, only four supply ports connected to a suitable ring supply line 36 (FIG. 4), to install the liquid inlets into channel 32 in such a way that the space between the supply ports and orifice 35 serves as a settling space. The liquid from ring line 36 flows round the edge of orifice 35 as shown by the arrows 37 and flows upwards as indicated by arrow 38, leaving the flow channel via overflow 33, preferably at one side.

Under orifice 35 there is a discharge device for the material which sinks; this can take the form, for example, of a drainage bucket conveyor 39. The heavy material from the dry separator is charged to the surface of the overflow 33; the organic material, including plastics, floats on the surface, assisted by the rising liquid flow, which should preferably be adjustable, while heavier components sink in a direction opposite to arrow 38. Because of the increased flow speed near orifice 35, the speed of sinking is retarded, so that here there is intensive swirling of the descending material, which causes, for example, pieces of label still attached to glass fragments to become detached and float to the top.

If the material is charged from a vibrating conveyor 40, the discharge edge of which is just above the surface of the liquid at overflow 33, the charging device presorts the heavy material, in that most of the material which sinks is on the floor of the conveyor trough, whereas the material which floats is mostly on top of the heavy material, which facilitates separation of the two material components.

The designs of the dry and wet separators represent only examples of constructions with special advantages; they can, however, be altered while conforming to the principles of the invention, and especially taking into account the requirements of the process, possibly also with modifications to suit the composition of the refuse. These modifications may affect the number and shape of the deflections in the dry separator, the number of wet separators or the slope or form of the insert in the wet separator.

While the water can be drained from both the buoyant material and the sunken material by means of a number of well-known devices, for example a draining bucket conveyor of the kind already mentioned, or a screw type classifier, it has proved specially advantageous in one arrangement to use a DSM screen for water drainage from the buoyant material. Since with this type of screen the liquid which contacts the screen surface stays on the screen bottom for a relatively long distance, this prevents the fibrous matter in the material which was floated off from clogging the screen mesh.

What is claimed is:

1. A process for sorting refuse into groups comprising the following consecutive steps:
   a. sifting the refuse;
   b. cutting the oversize obtained by step (a) to produce comminuted material;
   c. separating the comminuted material obtained in step (b) by a gas stream into a light material fraction and a heavy material fraction;
   d. separating the heavy material fraction obtained in step (c) by a liquid stream into components of relatively low and relatively high density;
   e. magnetically separating the component of relatively high density into ferrous and non-ferrous parts; and
   f. separating the non-ferrous part into a non-ferrous metal portion and a glass and ceramics portion.

2. A process as defined in claim 1, further comprising the step of separating the glass and ceramics portion into glass and ceramics components subsequent to step (f).

3. A process as defined in claim 2, further comprising the step of separating the glass component into a clear-glass part and a colored-glass part.

4. A process as defined in claim 1, further including the step of directing upwardly the flow of said gas stream.

5. A process as defined in claim 4, wherein the step of directing upwardly the flow of said gas stream includes the step of changing several times the direction of the upwardly flowing gas stream; step (c) including the step of introducing the comminuted material at the vertex of a directional change of the gas flow; step (c) further including the step of extracting said light material fraction with the gas subsequent to at least one additional deflection of gas flow; step (c) further including the step of separating the heavy material fraction from the gas stream subsequent to its sinking in the gas flow against the flow direction thereof; further comprising the steps of branching off a partial gas stream from the gas stream at the vertex of a directional change of the gas flow between the location of introduction of said comminuted material and the location of separation of said heavy material fraction from the gas stream for entraining medium-density material with the partial gas stream and introducing said partial gas stream into a trap for separating the medium-density material from said partial gas stream.

6. A process as defined in claim 5, further comprising the step of regulating the flow rate of said partial gas stream.

7. A process as defined in claim 1, further comprising the step of directing upwardly the flow of said liquid stream; the step (d) comprising the steps of directing the heavy material fraction obtained in step (c) onto the surface of said liquid stream for separating the heavy material fraction into buoyant and non-buoyant components; floating off said buoyant component by the liquid; and discharging said non-buoyant component from the liquid after it has sunk against the flow direction of said liquid stream.

8. A process as defined in claim 7, further including the step of regulating the velocity of the liquid stream flow.

9. A process as defined in claim 7, further comprising the step of drawing off the liquid stream as overflow at one side of said surface, said heavy material fraction being directed onto said surface at a side opposite the overflow.

10. A process as defined in claim 9, wherein the step of directing the heavy material fraction onto the surface of the liquid stream and the step of drawing off the liquid stream are codirectional.

11. A process as defined in claim 7, further comprising the step of introducing the buoyant component into an additional, upwardly flowing liquid stream for separating the buoyant component into two fractions of different density.

12. A process as defined in claim 7, wherein the step of directing the heavy material fraction onto the surface of the liquid stream includes the steps of vibrating the heavy material fraction by a vibrating conveyor and subsequently introducing the heavy material fraction from the vibrating conveyor onto the surface of the liquid stream by gravity from a small height.

13. A process as defined in claim 7, wherein the step of directing upwardly the flow of the liquid stream includes the step of so controlling the velocity of the liquid stream that at a substantial distance below the liquid surface the flow speed is, at least at one point, greater than in the zone above said point.

14. An apparatus for sorting refuse into groups, comprising in combination:
   a. a screening device having an outlet;
   b. a cutter-comminutor having an inlet connected to said outlet of said screening device;
   c. a charging device connected to an outlet of said cutter-comminutor;
   d. a dry separator connected to said cutter-comminutor through said charging device for receiving comminuted material from said cutter-comminutor and separating the comminuted material by a gas stream into a light material fraction and a heavy material fraction; said dry separator having
      1. a substantially vertically oriented gas duct of zig-zag course and substantially constant cross section; said gas duct having an upper inlet, a lower inlet and an upper outlet; said upper inlet being connected to said charging device;
      2. a gas flow generating means connected to said lower inlet for driving the gas upwardly in said gas duct and discharging the gas together with the light material fraction through said upper outlet;
   e. a wet separator having an inlet connected to said lower outlet of said dry separator; said wet separator receiving the heavy material fraction and separating the same by a liquid stream into two fractions of different density; and
   f. a magnetic separator having an inlet connected to an outlet of said wet separator.

15. An apparatus as defined in claim 14, further comprising an additional outlet provided at the location of a deflection of said zig-zag course between said upper inlet and said lower outlet for discharging a partial gas stream from said duct; and a trap coupled to said additional outlet for separating medium-density material from said partial gas stream.

16. An apparatus as defined in claim 15, wherein said additional outlet is arranged in alignment with said lower inlet.

17. An apparatus as defined in claim 15, further comprising a valve means for controlling the cross section of said additional outlet.

18. An apparatus as defined in claim 14, wherein said wet separator comprises a substantially vertically oriented liquid duct having a liquid inlet at a lower part thereof; an overflow means at the top of said liquid duct; the improvement further comprising an additional charging device having an inlet operatively connected to said lower outlet of said dry separator for receiving the heavy material fraction from said dry separator; said additional charging device having an outlet being disposed immediately above said overflow means for feeding the heavy material fraction onto the open surface of the liquid in said overflow means by free fall through a short distance.

19. An apparatus as defined in claim 18, further comprising means for controlling said liquid inlet.

20. An apparatus as defined in claim 18, wherein said overflow means being arranged for effecting a liquid run-off at one side thereof.

21. An apparatus as defined in claim 18, wherein said additional charging device is constituted by a vibrating conveyor having a discharge edge forming said outlet of said additional charging device.

22. An apparatus as defined in claim 18, wherein said liquid duct includes means for narrowing the cross section thereof at least at one location below its top for accelerating the liquid flow at said at least one location.

23. An apparatus as defined in claim 18, further comprising a DSM screen coupled to said overflow means for receiving material floated off said wet separator through said overflow means.

* * * * *